United States Patent
Gallier et al.

(10) Patent No.: US 11,021,967 B2
(45) Date of Patent: Jun. 1, 2021

(54) TURBINE ENGINE COMPONENT WITH A CORE TIE HOLE

(71) Applicant: General Electric Company, Schenectady, NY (US)

(72) Inventors: Kirk D. Gallier, Cincinnati, OH (US); Cedric Carlton Lowe, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 422 days.

(21) Appl. No.: 15/477,335

(22) Filed: Apr. 3, 2017

(65) Prior Publication Data

US 2018/0283183 A1    Oct. 4, 2018

(51) Int. Cl.
| | |
|---|---|
| *F01D 5/18* | (2006.01) |
| *F01D 9/04* | (2006.01) |
| *F01D 25/12* | (2006.01) |
| *F01D 25/32* | (2006.01) |
| *B22C 9/10* | (2006.01) |

(52) U.S. Cl.
CPC ............... *F01D 5/187* (2013.01); *B22C 9/10* (2013.01); *F01D 9/04* (2013.01); *F01D 25/12* (2013.01); *F01D 25/32* (2013.01); *F05D 2220/30* (2013.01); *F05D 2230/211* (2013.01); *F05D 2240/304* (2013.01); *F05D 2240/307* (2013.01); *F05D 2250/141* (2013.01); *F05D 2260/202* (2013.01)

(58) Field of Classification Search
CPC . F01D 5/18; F01D 5/186; F01D 5/187; F01D 5/20; F01D 25/12; F05D 2220/30; F05D 2230/211; F05D 2240/304; F05D 2240/307; F05D 2260/202; B22C 9/10

USPC ........................................ 415/115; 416/97 R
See application file for complete search history.

(56) References Cited

U.S. PATENT DOCUMENTS

| | | | | | |
|---|---|---|---|---|---|
| 4,775,296 | A | * | 10/1988 | Schwarzmann | ........ F01D 5/187 415/115 |
| 4,992,026 | A | * | 2/1991 | Ohtomo | ................... F01D 5/187 415/115 |
| 5,403,157 | A | * | 4/1995 | Moore | ..................... F01D 5/188 415/115 |
| 5,403,159 | A | * | 4/1995 | Green | ...................... F01D 5/187 416/97 R |
| 5,564,902 | A | * | 10/1996 | Tomita | ....................... F01D 5/20 415/115 |
| 5,902,093 | A | * | 5/1999 | Liotta | ........................ F01D 5/20 415/115 |

(Continued)

FOREIGN PATENT DOCUMENTS

CN        104675445 A       6/2015

OTHER PUBLICATIONS

Chinese Patent Office, Office Action re Chinese Application No. 201810310269.8, dated Jan. 20, 2020, 7 pages, China.

*Primary Examiner* — John M Zaleskas
(74) *Attorney, Agent, or Firm* — McGarry Bair PC (57) ABSTRACT

An apparatus and method of forming an engine component having an outer wall forming an interior. The interior can be separated into two or more flow paths or flow channels. The two flow paths can be formed by casting having one or more core ties connecting the flow paths during casting. One or more core tie holes can be formed remnant of the core ties during casting in order to fluidly couple the two or more flow paths or flow channels.

4 Claims, 9 Drawing Sheets

(56) References Cited

U.S. PATENT DOCUMENTS

| | | | | |
|---|---|---|---|---|
| 5,975,851 A * | 11/1999 | Liang | | F01D 5/186 416/97 R |
| 6,036,440 A * | 3/2000 | Tomita | | F01D 5/187 415/114 |
| 6,139,269 A * | 10/2000 | Liang | | F01D 5/20 416/97 R |
| 6,164,914 A * | 12/2000 | Correia | | F01D 5/186 415/115 |
| 6,220,817 B1 * | 4/2001 | Durgin | | F01D 5/187 415/115 |
| 6,340,047 B1 * | 1/2002 | Frey | | B22C 21/14 164/122.1 |
| 6,347,923 B1 * | 2/2002 | Semmler | | F01D 5/187 416/97 R |
| 6,595,748 B2 * | 7/2003 | Flodman | | F01D 5/186 415/115 |
| 6,634,858 B2 | 10/2003 | Roeloffs et al. | | |
| 6,896,487 B2 | 5/2005 | Cunha et al. | | |
| 7,575,414 B2 | 8/2009 | Lee | | |
| 7,597,540 B1 * | 10/2009 | Liang | | F01D 5/186 416/97 R |
| 7,704,046 B1 * | 4/2010 | Liang | | F01D 5/187 416/96 R |
| 8,083,486 B1 * | 12/2011 | Liang | | F01D 5/187 415/115 |
| 8,292,582 B1 * | 10/2012 | Liang | | F01D 5/187 416/1 |
| 8,454,301 B1 * | 6/2013 | Liang | | F01D 5/081 415/116 |
| 8,568,097 B1 * | 10/2013 | Liang | | F01D 5/187 416/97 R |
| 8,840,363 B2 | 9/2014 | Lee | | |
| 8,864,467 B1 * | 10/2014 | Liang | | F01D 5/187 416/96 R |
| 9,091,176 B2 | 7/2015 | Martin et al. | | |
| 9,206,695 B2 | 12/2015 | Pointon et al. | | |
| 9,228,439 B2 | 1/2016 | Pointon et al. | | |
| 9,366,143 B2 | 6/2016 | Lee et al. | | |
| 2001/0016163 A1 * | 8/2001 | Tomita | | F01D 5/186 416/193 A |
| 2002/0106275 A1 * | 8/2002 | Harvey | | F01D 5/187 415/115 |
| 2004/0219017 A1 * | 11/2004 | Liang | | F01D 5/187 416/97 R |
| 2005/0084370 A1 * | 4/2005 | Gross | | F01D 5/188 416/95 |
| 2005/0265839 A1 * | 12/2005 | Mongillo, Jr. | | F01D 5/187 416/97 R |
| 2005/0265844 A1 * | 12/2005 | Levine | | F01D 5/187 416/97 R |
| 2005/0276698 A1 * | 12/2005 | Kvasnak | | F01D 5/005 416/115 |
| 2005/0281671 A1 * | 12/2005 | Liang | | F01D 5/187 416/1 |
| 2005/0281674 A1 * | 12/2005 | Liang | | F01D 5/187 416/97 R |
| 2006/0013688 A1 * | 1/2006 | Papple | | F01D 5/187 416/97 R |
| 2006/0133935 A1 * | 6/2006 | Papple | | F01D 5/187 416/97 R |
| 2006/0285974 A1 * | 12/2006 | Bunker | | F01D 5/20 416/97 R |
| 2007/0041835 A1 * | 2/2007 | Charbonneau | | F01D 5/187 416/97 R |
| 2007/0140851 A1 * | 6/2007 | Hooper | | F01D 5/187 416/97 R |
| 2008/0118366 A1 * | 5/2008 | Correia | | F01D 5/187 416/97 R |
| 2009/0003987 A1 * | 1/2009 | Zausner | | F01D 5/187 415/115 |
| 2009/0041586 A1 * | 2/2009 | Bacha | | F01D 5/187 416/97 R |
| 2009/0081024 A1 * | 3/2009 | Tibbott | | F01D 5/187 415/115 |
| 2009/0252615 A1 * | 10/2009 | Gross | | F01D 5/187 416/97 R |
| 2009/0317234 A1 * | 12/2009 | Zausner | | F01D 5/187 415/115 |
| 2010/0284807 A1 * | 11/2010 | Tibbott | | F01D 5/187 416/95 |
| 2012/0230838 A1 * | 9/2012 | Hada | | F01D 5/187 416/97 R |
| 2012/0269649 A1 * | 10/2012 | Rawlings | | F01D 5/187 416/97 R |
| 2013/0142666 A1 * | 6/2013 | Lee | | F01D 5/187 416/97 R |
| 2013/0243606 A1 * | 9/2013 | Crites | | F01D 5/187 416/96 R |
| 2013/0343872 A1 * | 12/2013 | Tibbott | | F01D 5/186 415/115 |
| 2014/0056719 A1 * | 2/2014 | Morisaki | | F01D 5/186 416/97 R |
| 2014/0083116 A1 * | 3/2014 | Crites | | F01D 5/187 60/806 |
| 2014/0169962 A1 * | 6/2014 | Lee | | F01D 5/186 416/1 |
| 2014/0178207 A1 * | 6/2014 | He | | F01D 5/20 416/96 R |
| 2015/0030432 A1 * | 1/2015 | Smith | | B23P 6/002 415/115 |
| 2015/0040582 A1 * | 2/2015 | Dong | | F01D 5/187 60/806 |
| 2015/0147158 A1 * | 5/2015 | Wang | | F01D 5/187 415/115 |
| 2015/0152737 A1 | 6/2015 | Liang | | |
| 2015/0330228 A1 * | 11/2015 | Quach | | F01D 5/187 416/95 |
| 2016/0017719 A1 * | 1/2016 | Propheter-Hinckley | | F01D 5/187 416/1 |
| 2016/0108740 A1 * | 4/2016 | Srinivasan | | F01D 5/188 |
| 2016/0115796 A1 * | 4/2016 | Taniguchi | | F01D 5/187 416/97 R |
| 2016/0160657 A1 * | 6/2016 | Lewis | | F01D 5/187 415/115 |
| 2016/0194965 A1 * | 7/2016 | Spangler | | F01D 5/187 415/115 |
| 2017/0058678 A1 * | 3/2017 | Lee | | F01D 5/187 |
| 2017/0101872 A1 * | 4/2017 | Bregman | | F01D 5/187 |
| 2017/0175550 A1 * | 6/2017 | Smith | | F01D 5/187 |
| 2017/0234142 A1 * | 8/2017 | Benson | | F01D 5/187 60/806 |
| 2017/0370232 A1 * | 12/2017 | Lee | | F01D 5/08 |
| 2018/0051572 A1 * | 2/2018 | Hoffman | | F04D 29/542 |
| 2018/0202294 A1 * | 7/2018 | Spangler | | F01D 5/187 |
| 2018/0298763 A1 * | 10/2018 | Lee | | F01D 5/187 415/115 |
| 2018/0298764 A1 * | 10/2018 | Ahmad | | F01D 5/187 |

* cited by examiner

TURBINE ENGINE COMPONENT WITH A CORE TIE HOLE

STATEMENT REGARDING FEDERALLY SPONSORED RESEARCH OR DEVELOPMENT

This invention was made with government support under Contract No. FA8650-09-D-2922 awarded by the United States Government. The United States Government has certain rights in this invention.

BACKGROUND OF THE INVENTION

Turbine engines, and particularly gas or combustion turbine engines, are rotary engines that extract energy from a flow of combusted gases passing through the engine onto a multitude of rotating turbine blades.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades generally include one or more interior cooling circuits for routing the cooling air through the blade to cool different portions of the blade, and can include dedicated cooling circuits for cooling different portions of the blade, such as the leading edge, trailing edge and tip of the blade.

BRIEF DESCRIPTION OF THE INVENTION

In one aspect, the present disclosure relates to a blade for a turbine engine including an outer wall bounding an interior and defining a pressure side and a suctions side extending axially between a leading edge and a trailing edge to define a chord-wise direction and extending radially between a root and a tip to define a span-wise direction. A trailing edge plenum is provided within the interior extends at least partially in the span-wise direction and includes a tip turn extending to an outlet for the trailing edge plenum. A trailing edge cooling channel is provided within the interior, radially within the tip turn, and adjacent the trailing edge. A plurality of trailing edge exhaust holes include an inlet at the trailing edge cooling channel and an outlet at the trailing edge. At least one core tie hole fluidly couples the tip turn to the trailing edge passage at the tip flag.

In another aspect, the present disclosure relates to a component for a turbine engine including an outer wall bounding an interior. A first channel is provided in the interior extending at least partially in a first direction and a second channel is provided in the interior separated from the first cooling channel by an internal wall and extending at least partially in a second direction. At least one core tie hole fluidly couples the first channel to the second channel and has an inlet and an outlet defining a passage therebetween.

In yet another aspect, the present disclosure relates to a method of flowing a fluid through an engine component for a turbine engine including passing a volume of air through a core tie hole from a first channel to a second channel.

DETAILED DESCRIPTION OF THE INVENTION

Aspects of the disclosure described herein are directed to core tie holes formed in an engine component for a turbine engine. For purposes of illustration, the present disclosure will be described with respect to the turbine for an aircraft gas turbine engine and to an airfoil provided in the gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
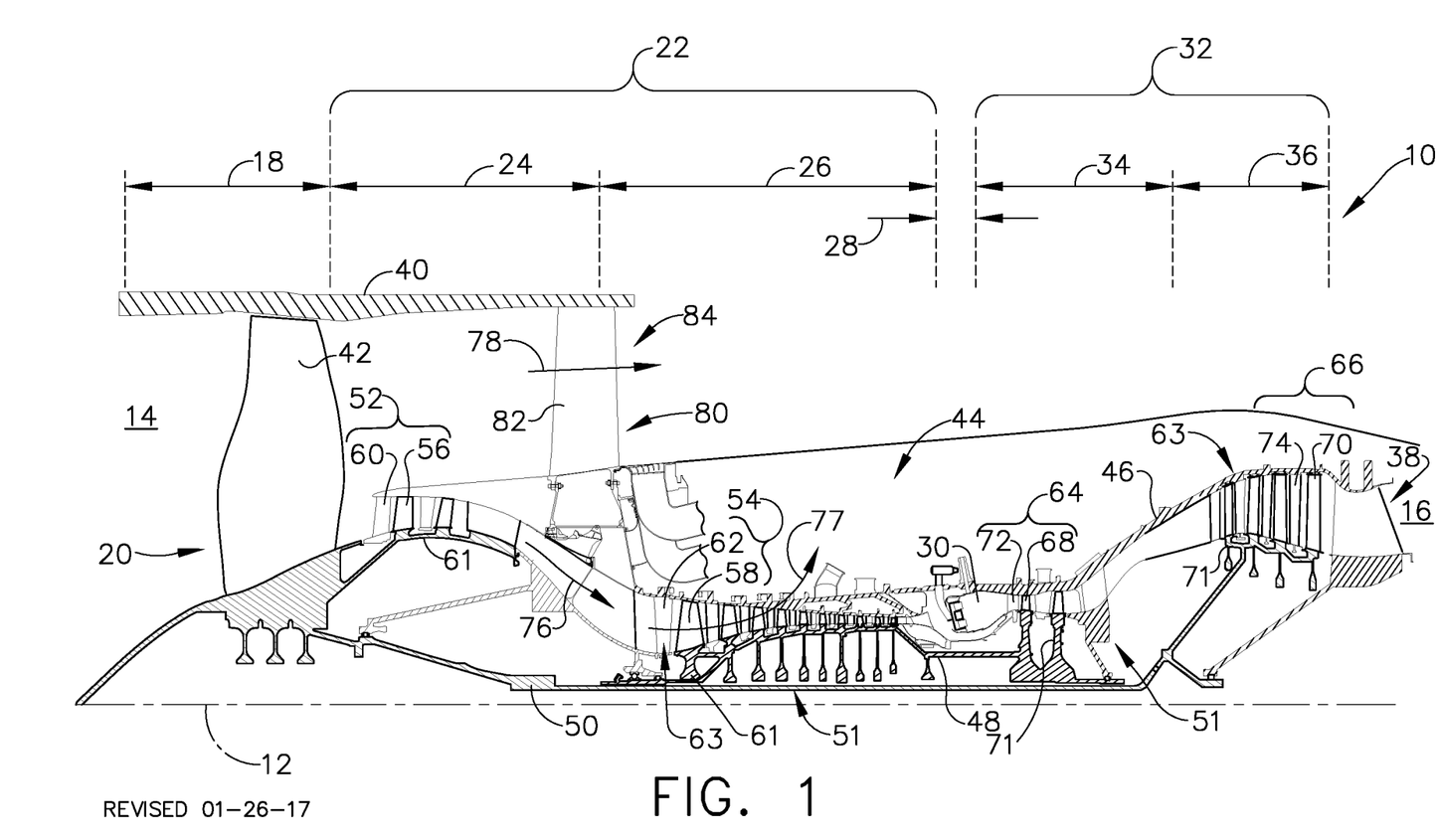
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
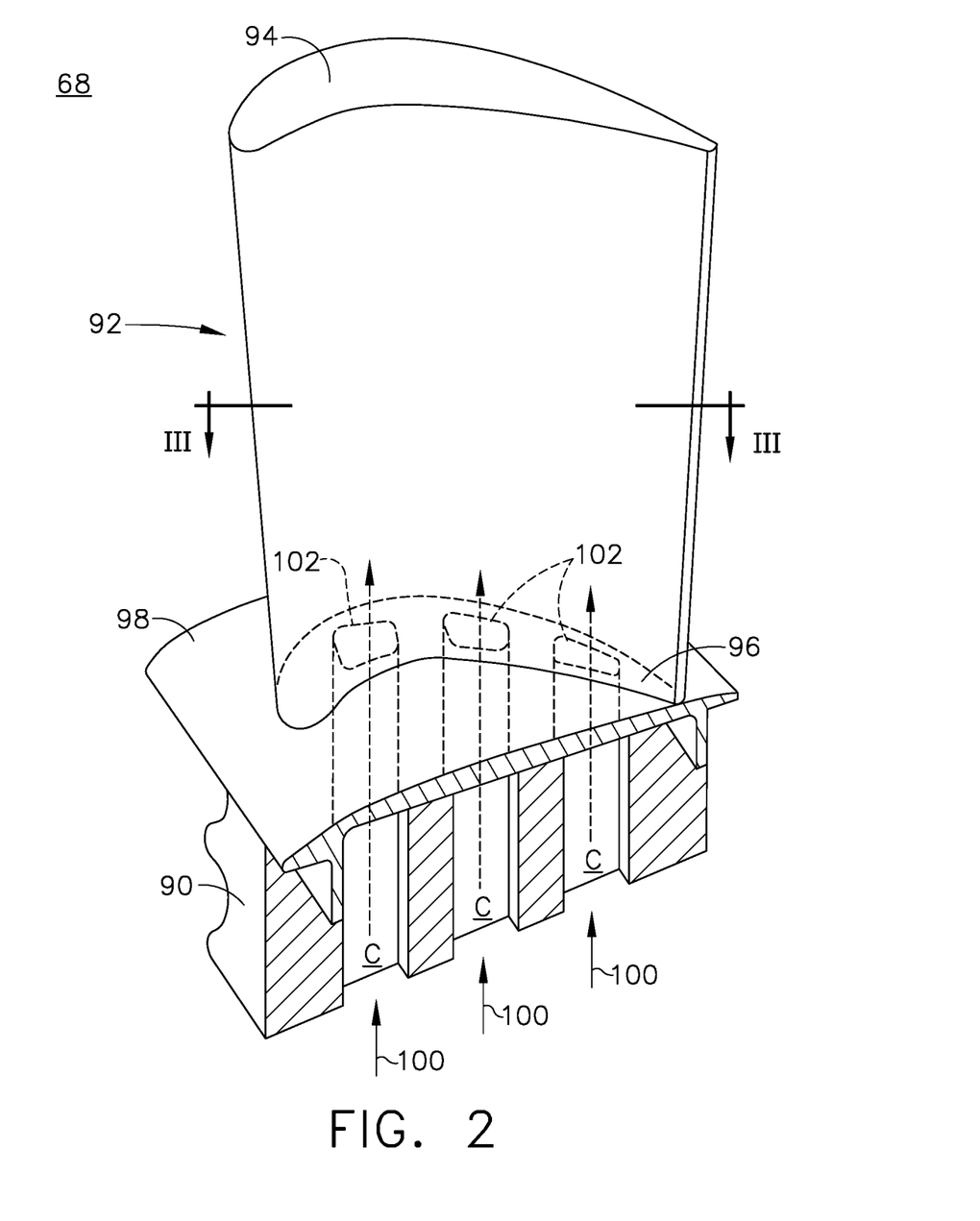
FIG. 2 is a perspective view of an airfoil of the engine of FIG. 1 in the form of a blade.

FIG. 2 illustrates an engine component in the form of one of the turbine blades 68 including a dovetail 90 and an airfoil 92. The airfoil 92 includes a tip 94 and a root 96 defining a span-wise direction therebetween. The airfoil 92 mounts to the dovetail 90 at a platform 98 at the root 96. The platform 98 helps to radially contain a turbine engine mainstream airflow driven by the blade 68. The dovetail 90 can be configured to mount to a turbine rotor disk on the engine 10. The dovetail 90 further includes at least one inlet passage 100, shown as a three inlet passages 100, each extending through the dovetail 90 to provide internal fluid communication with the airfoil 92 at a passage outlet 102. It should be appreciated that the dovetail 90 is shown in cross-section, such that the inlet passages 100 are housed within the body of the dovetail 90. A flow of cooling fluid C can be provided to the airfoil 92 through the inlet passage 100.

Figure 3:
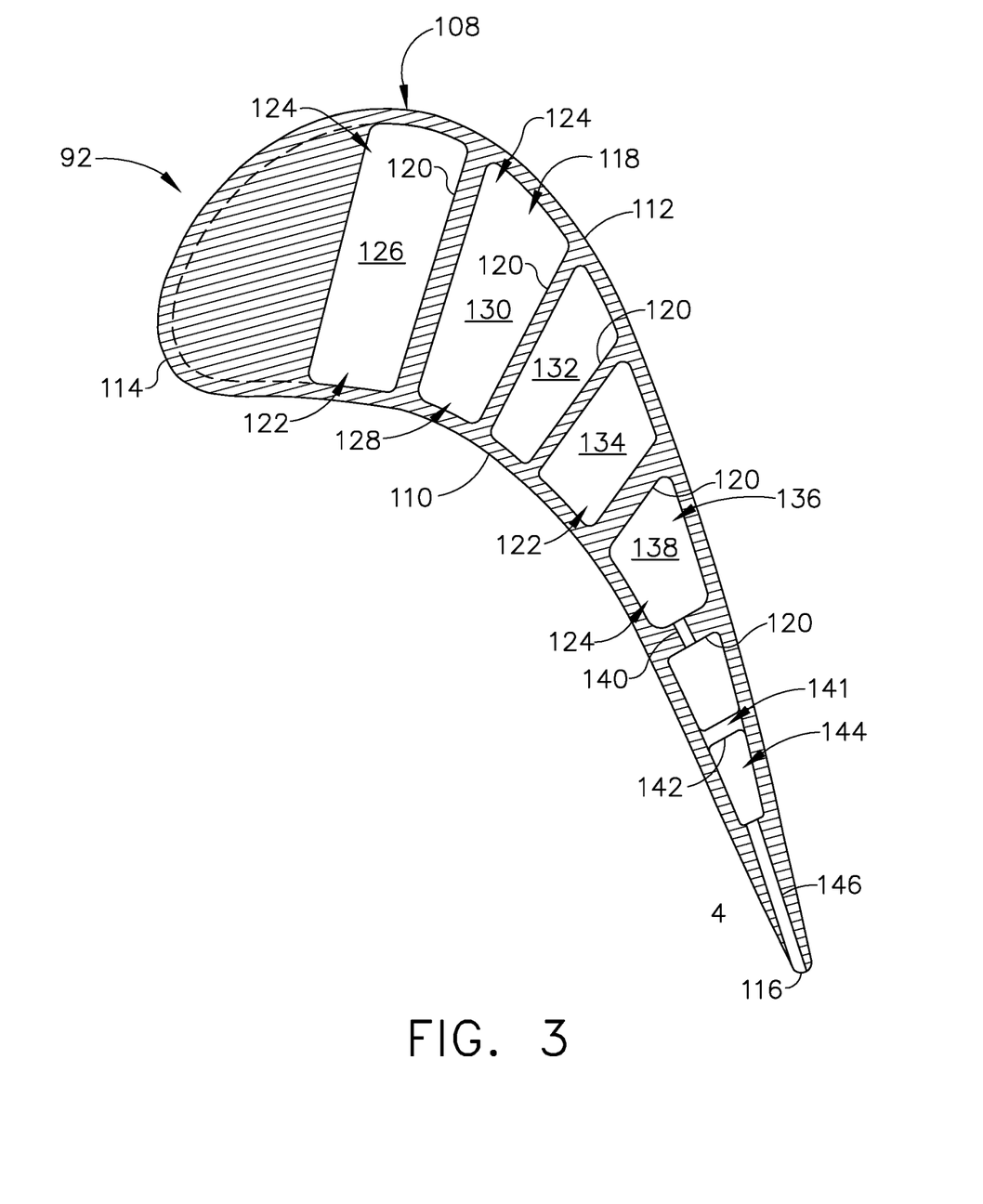
FIG. 3 is a cross-section along lines of the airfoil of FIG. 2 illustrating cooling passages within the airfoil defining a cooling circuit.

FIG. 3 shows a cross section of the airfoil 92 taken along section of FIG. 2 including an outer wall 108 with a concave-shaped pressure sidewall 110 and a convex-shaped suction sidewall 112 joined together to define an airfoil shape with a leading edge 114 and a trailing edge 116, defining a chord-wise direction therebetween. The blade 68 rotates in a direction such that the pressure sidewall 110 follows the suction sidewall 112. Thus, as shown in FIG. 3, the airfoil 92 would rotate upward toward the top of the page.

An interior 118 is defined by the outer wall 108. One or more ribs 120 can divide the interior 118 into multiple cooling channels 122. The cooling channels 122 can fluidly couple to one or more other cooling channels or features formed within the airfoil 92 to define one or more cooling circuits 124. The exemplary airfoil 92 shown in FIG. 2 includes a leading edge cooling channel 126, which can be positioned closest to the leading edge 114. In an alternative example, the leading edge cooling channel 126 can extend to be adjacent the leading edge 114, illustrated in dashed line. A middle cooling circuit 128 can be defined by a first cooling channel 130, a second cooling channel 132, and a third cooling channel 134 fluidly coupled to one another. A trailing edge cooling circuit 136 can include a trailing edge plenum 138 with a plurality of openings 140 fluidly 141 coupling the trailing edge plenum 138 to a trailing edge cooling channel 144. A set of pins 141 forming a pin bank 142 can be providing within a trailing edge cooling channel 144. In one example, the openings 140 can impinge upon the pins 141. One or more trailing edge exhaust holes 146 can fluidly couple the trailing edge cooling circuit 136 to the exterior of the airfoil 92 at the trailing edge 116. The trailing edge exhaust holes 146 can have an inlet at the trailing edge cooling channel 136 and an outlet at the trailing edge 116. It should be appreciated that the leading edge cooling channel 126, the middle cooling circuit 128, and the trailing edge cooling circuit 136 are exemplary as illustrated. The interior 118 of the airfoil 92 can be organized in a myriad of different ways, and can include single channels extending in the span-wise direction, or can be complex cooling circuits, having multiple features such as passages, channels, inlets, outlets, pin banks, circuits, sub-circuits, film holes, plenums, mesh, turbulators, or otherwise in non-limiting examples.

Figure 4:
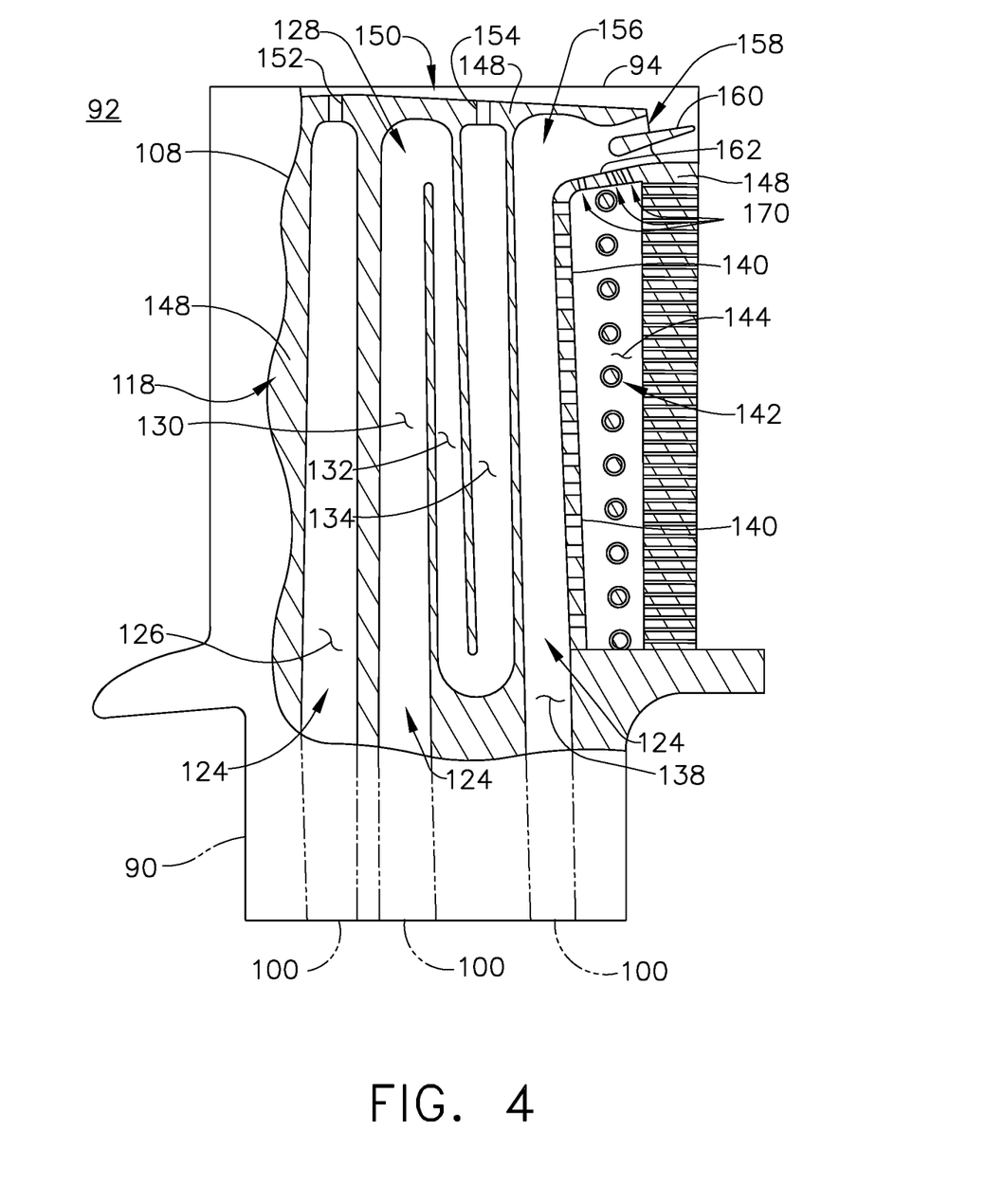
FIG. 4 is a schematic front view of the airfoil of FIG. 3 with a portion of the sidewall removed to illustrate the geometry of the cooling circuit.

Turning to FIG. 4, a portion of the outer wall 108 is removed to better illustrate the cooling circuits 124 extending through the interior 118. The leading edge cooling channel 126 is fed from one inlet passage 100 and can exhaust at a tip channel 150 through a first tip outlet 152. The middle cooling circuit 128 forms a serpentine path, fluidly coupling the first, second, and third cooling channels 130, 132, 134. The middle cooling circuit 128 exhausts to the tip channel 150 through a second tip outlet 154.

The trailing edge plenum 138 extends toward the tip 94 in a substantially span-wise direction, terminating in a tip turn 156 and exhausting at a tip flag 158. Substantially span-wise can be in a radial direction, or partially offset from a radial direction relative to the engine centerline. An exhaust element 160 can be provided at the tip flag 158 to accelerate the fluid exhausting at the tip flag 158. The trailing edge cooling channel 144 can be substantially parallel to the trailing edge plenum 144. Substantially parallel can include a passage centerline for the trailing edge plenum 138 and the trailing edge cooling channel 144 that can be offset of a small angle, such as less than ten degrees, in one non-limiting example. The tip turn 156 can define the extent of the trailing edge cooling channel 144, turning over the span-wise extent over the trailing edge cooling channel 144. A turn wall 162 can separate the trailing edge plenum 138 and the trailing edge cooling channel 144 at the tip turn 156.

One or more core tie holes 170, shown as three core tie holes 170, can be provided in the turn wall 162 fluidly coupling the tip turn 156 of the trailing edge plenum 138 to the trailing edge cooling channel 144. The core tie holes 170 can be positioned forward or aft of the pin bank 142 relative to the chord-wise direction. The core tie holes 170 can be remnant of casting the airfoil 92, and can be formed during casting.

Figure 5:
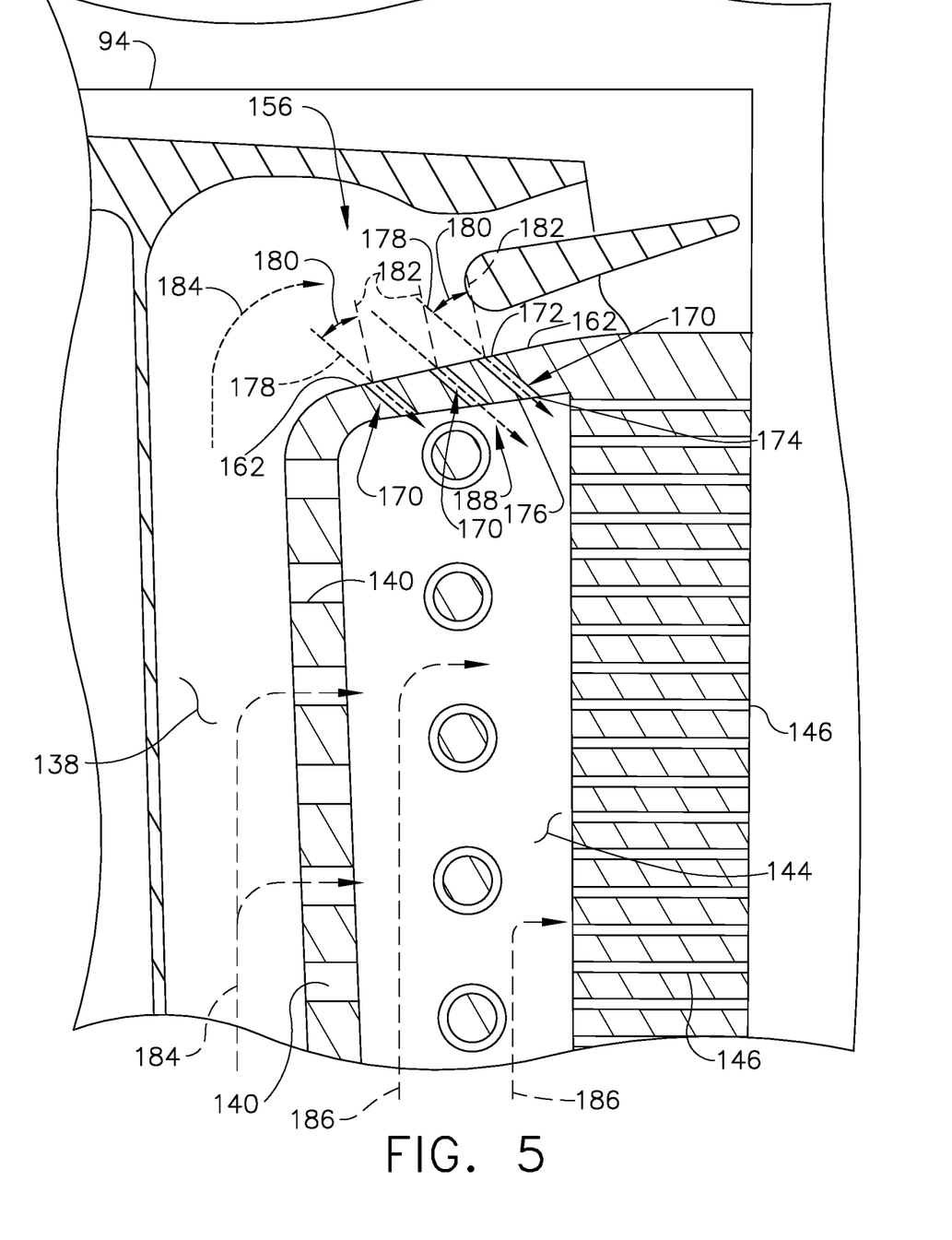
FIG. 5 is an enlarged view of a tip flag portion of the front view of FIG. 4 illustrating core tie holes.

Looking at FIG. 5, the core tie holes 170 can include an inlet 172 at the tip turn 156 and an outlet 174 at the trailing edge cooling channel 144, with a passage 176 defined between the inlet 172 and the outlet 174. The passage 176 can be straight, to define a linear passage axis 178 through the core tie hole 170. The core tie hole 170 can be disposed at an angle 180 within the turn wall 162. The angle 180 can be defined between the passage axis 178 and an orthogonal axis 182 extending from the turn wall 162 orthogonal to the surface of the turn wall 162 at the inlet 172. The angle 180 can be between 20-degrees and 70-degrees, for example, while the angle 180 can be determined based upon anticipated flow rates, pressure differentials, or flow direction. In alternative examples, such as that shown in FIG. 7, the core tie holes 170 can be angled in the opposite direction. As such, it should be appreciated that the angle 180 can be between +/−70 degrees, depending on the particular orientation of the core tie hole 170.

While the core tie holes 170 are illustrated as being linear, it is contemplated that the core tie holes 170 can be linear, non-linear, segmented, curved, unique, or any combination thereof in non-limiting examples. In the case of a non-linear core tie hole, the local centerline of the passage adjacent the inlet 172 or outlet 174 can be used to determine the angle 180 of the core tie hole 170. Furthermore, the core tie holes 170 can have a constant cross-sectional shape or area along the length of the passage 176, or can have a variable cross-sectional shape, area, or both. Further still, in the case of multiple core tie holes 170, each individual core tie hole 170 can differ from the other core tie holes 170. For example, the forward-most core tie hole 170, or the core tie hole 170 nearest the leading edge, can have a cross-sectional area that is greater than the other two core tie holes 170. That core tie hole 170 could have an elongated, race-track, cross-sectional profile, while the second and third core tie holes 170, in chord-wise arrangement extending aft, could have an oval and circular cross-sectional shape with diminishing or decreasing cross-sectional areas in a direction toward the trailing edge. The variable cross-sectional shapes and sizes can be used to particularly tailor flow rates, volumes, or pressures locally. In another example, the core tie holes 170 can be have profiles with cross-sectional diameters defining major diameters as the greatest cross-sectional diameter. The core tie holes 170 can be arranged with decreasing major diameters in a direction toward the trailing edge. In the case of three core tie holes 170, the furthest from the trailing edge could have the racetrack profile, the middle core tie hole 170 could have the oval profile, and the core tie hole 170 nearest the trailing edge could have the circular profile.

During operation, a flow of cooling air can be supplied to the trailing edge plenum 138 as a plenum flow 184. A portion of the plenum flow 184 can pass through the openings 140 to the trailing edge cooling channel 144 as a channel flow 186. As the channel flow 186 moves radially outward toward the tip 94, the pressure within the trailing edge cooling channel 144 can drop as a majority of the channel flow 186 exhausts through the trailing edge exhaust holes 146. The pressure drop can cause unequal fluid exhaustion along the trailing edge exhaust holes 146, which can cause losses or stagnation at the radially outer end of the trailing edge cooling channel 144.

A flow 188 can pass through the core tie holes 170 from the tip turn 156 to the trailing edge cooling channel 144. The flow 188 can be used to improve the flow at the radially outer trailing edge exhaust holes 146 and optimizing flow rates within the trailing edge plenum 138 and the trailing edge cooling channel 144. The angle 180 can be adapted to provide directionality for the flow 188, adapted to control the vector of the flow passing through the core tie hole 170, or minimize particular stagnation areas at the radially outer portion of the trailing edge cooling channel 144. For example, the core tie hole 170 is angled to receive the plenum flow 184. If the core tie hole 170 was angled in the opposite direction, the plenum flow 184 would need to turn against itself in order to enter the passage 176. Thus, angle 180 can be used to determine the direction of the flow passing through the core tie hole 170. It should also be appreciated that the orientation of the core tie holes 170 can alternatively be organized based upon anticipated pressure differentials between the trailing edge plenum 138 and the trailing edge cooling channel 144, having a proper flow direction relative to those pressure differentials.

Figure 6:
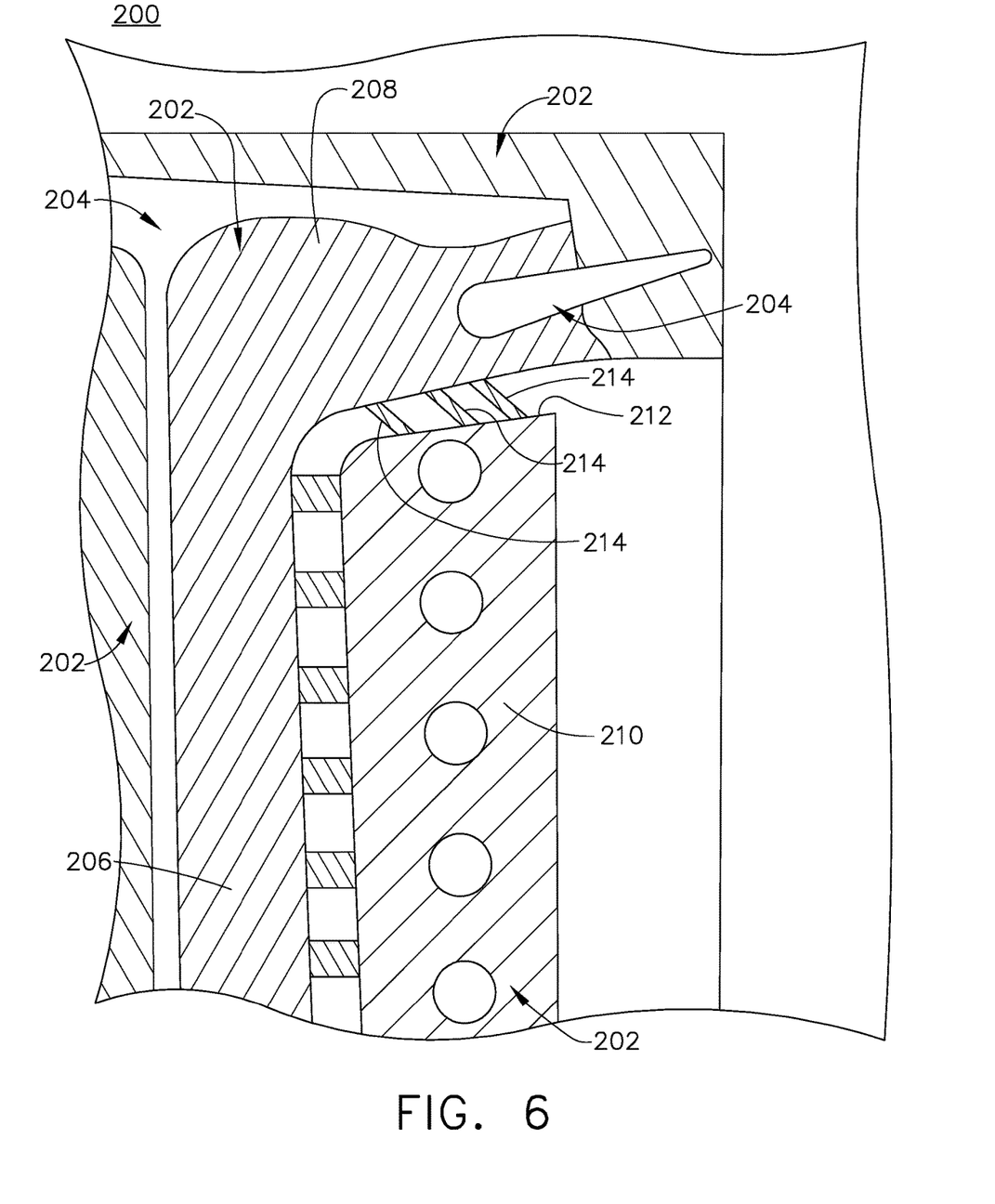
FIG. 6 is a view of a core for forming the tip flag portion of FIG. 5.

The airfoil 92 as described herein can be formed using a core casting process. Referring to FIG. 6, a core 200 can be used to form the airfoil 92 as a single, monolithic, cast element. During the casting process, the core 200 can be formed having solid portions 202, represented by the section lines, to form portions of the cooling channels 122 or cooling circuits 124 of the airfoil 92, and hollow portions 204, which can be used to form solid elements of the airfoil 92, such as ribs 120 or the outer wall 108. While the solid portions are identified by different section lines, it should be understood that the core 200 can be a single monolithic core, with the differing lines used to illustrate the different portions of the core 200.

A first solid portion 206 having a turn 208 can be used to form the trailing edge plenum 138 and a second solid portion 210 having a radial terminal surface 212 can be used to form the trailing edge cooling channel 144. One or more core ties 214 can be formed in the core 200 extending between the first solid portion 204 at the turn 208 and the radial terminal surface 212 of the second portion 210. The core ties 214 form the core tie holes 170 during casting of the airfoil 92. The hollow portions 204 can be filled with a fluid material, such as liquid metal, to form the airfoil 92. After filling, the fluid material hardens. After hardening, the solid portions 202 of the core 200 can be removed from the cast airfoil 92, such as by leaching in one non-limiting example, leaving the remaining airfoil 92 having the core tie holes 170 remnant of the core ties 214 during the casting process.

The core ties 214 utilized during the casting process can provide for improved strength and structural integrity for the core 200 and the resultant airfoil 92. Core ties 214 utilized can provide for a higher product yield. Similarly, the core tie holes 170 resultant of the core ties 214 can provide for optimizing supply cavity flow rates, particularly at the trailing edge plenum 138 and the trailing edge cooling channel 144, as well as improving flow at the radially outer trailing edge exhaust holes 146. The core tie holes 170 resultant of the core ties 214 provide for improved airflow where traditional drilling of holes in the airfoil is difficult or impossible. The structure of the airfoil 92 can be at least partially developed during casting, or can be further formed after formation, such as by drilling or adapting portions of the cast airfoil 92 tailored to the particular needs for the intended implementation of the airfoil 92.

Figure 7:
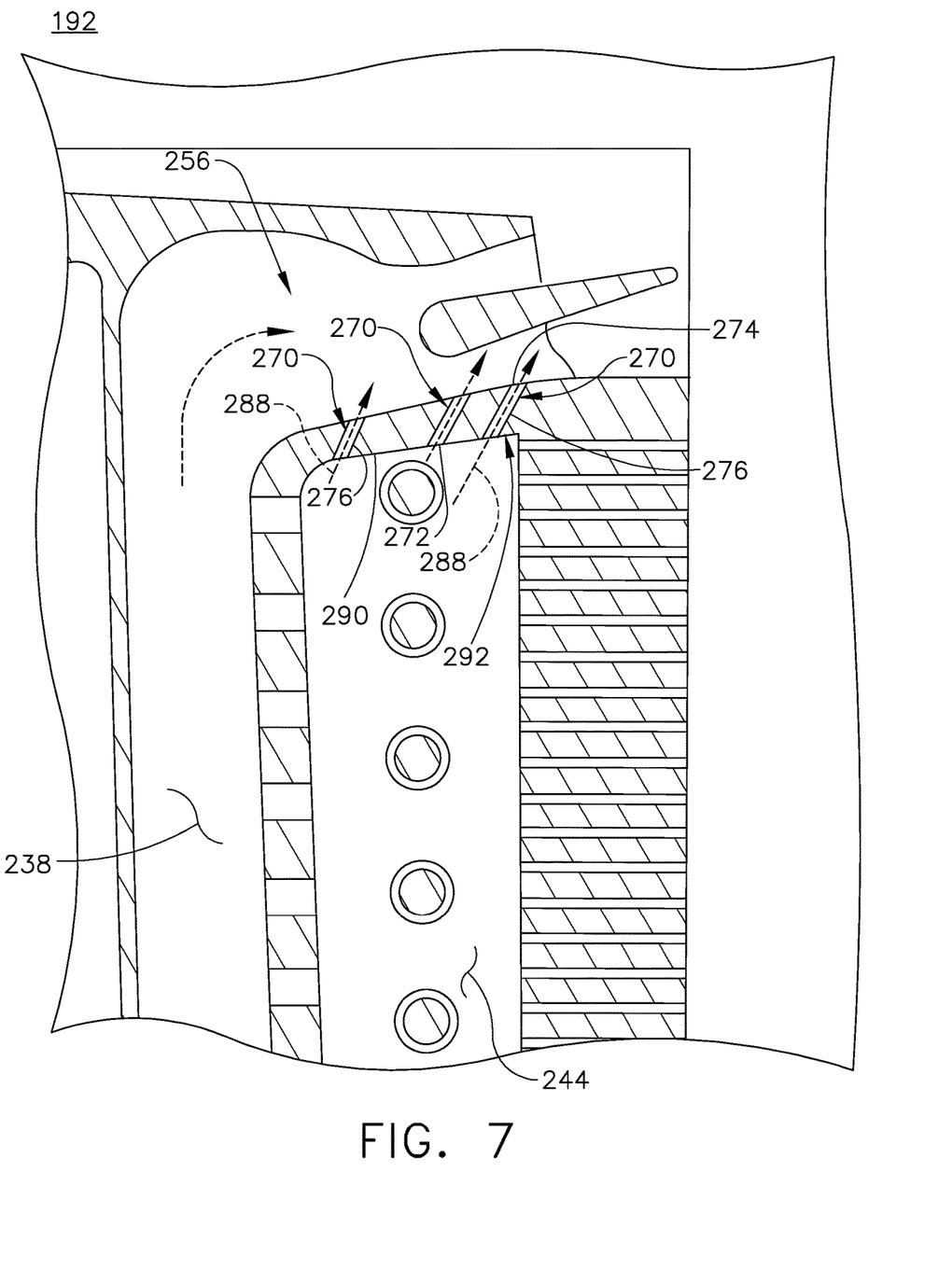
FIG. 7 is a view of an alternative tip flag portion having core tie holes angled in an opposite direction.

Referring now to FIG. 7, another exemplary airfoil 192 includes three core tie holes 270. The airfoil 192 can be substantially similar to the airfoil 92 of FIGS. 2-5. As such, similar numerals will be used to describe similar elements, increased by a value of one-hundred, and the discussion will be limited to the differences between the two. In FIG. 7, the core tie holes 270 are arranged having an inlet 272 provided in a trailing edge cooling channel 244 and an outlet 274 provided on a tip turn 256 of a trailing edge plenum 238, with the inlet 272 arranged forward of the outlet 274. A passage 276 extends between the inlet 272 and the outlet 274. A core tie flow 288 can pass through the passage 276 from the trailing edge cooling channel 244 to the tip turn 256 in the trailing edge plenum 238.

The orientation of the core tie holes 270 can be used to determine a flow vector or flow direction, while the orientation of the core tie holes 270 can be determined based upon anticipated pressure differentials in the trailing edge plenum 238 and the trailing edge cooling channel 244. As illustrated, the flow direction can be from the trailing edge cooling channel 244 to the tip turn 256 in the substantially same direction as both a plenum flow 284 and a channel flow 286, which can reduce losses as well as minimize flow stagnation within the radially outer end of the trailing edge cooling channel 244.

Furthermore, the orientation of the core tie holes 270 can minimize dust collection at a radially outer end 292 of the trailing edge cooling channel 244 defining a radially inward facing surface 290. During operation, the centrifugal force generated by the rotation of the airfoil 192, as an exemplary rotating blade, can cause collection of particulate matter at the inward facing surface 290 of the radially outer end 292 of the trailing edge cooling channel 244. The core tie holes 270 positioned at the radially outer end of the trailing edge cooling channel 244 provides for an exhausting flow as the core tie flow 288 to eject the particulate matter through the core tie holes 270, reducing collection of particulate matter within the trailing edge cooling channel 244 at the radially outer end 292.

Figure 8:
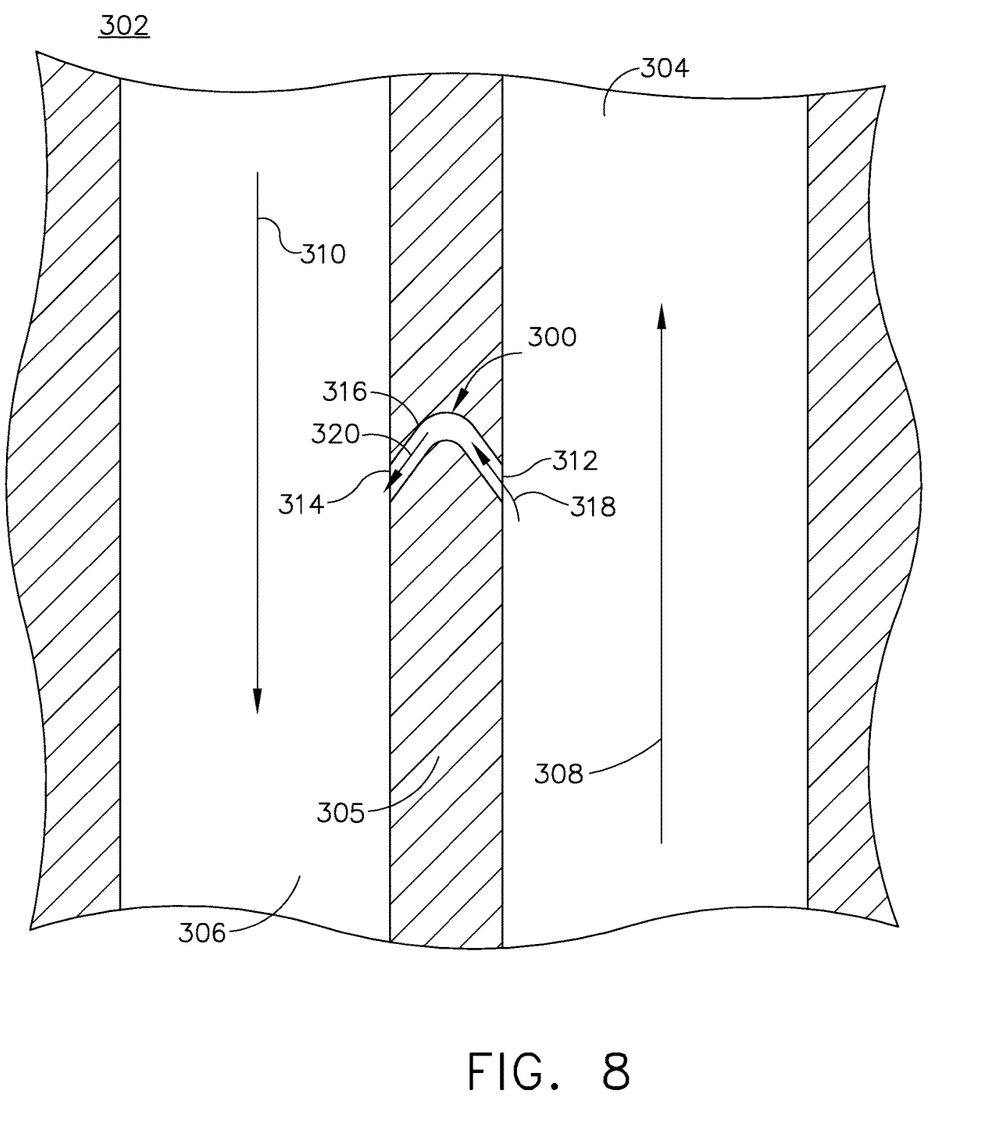
FIG. 8 is a section view of a curved core tie hole between adjacent cooling passages with flow paths in opposite directions.

Referring to FIG. 8 a core tie hole 300 can be provided in a cast engine component 302. A non-exhaustive list of such engine components can include blades, vanes, airfoils, shrouds, or nozzles, while any component having adjacent flow paths and can be formed by casting is contemplated. The engine component 302 can have a first flow channel 304 and a second flow channel 306 defining a first flow direction 308 and a second flow direction 310, respectively. An internal wall 305 separates the first and second flow channels 304, 306. The first flow direction 308 can flow in a direction opposite of the second flow direction 310. The core tie hole 300 can be provided in the internal wall 305 and can include an inlet 312 and an outlet 314, defining a passage 316 therebetween. The core tie hole 300 can be remnant of a core tie during casting of the engine component 302. The core tie hole 300 can be curved, or arcuate, such that the inlet 312 forms an inlet flow path 318 and the outlet 314 forms an outlet flow path 320 that are both aligned with their respective flow directions 308, 310. The curvature of the core tie hole 300 can be adapted such that the inlet flow path 318 is aligned to receive a portion of fluid from the first flow channel 304 along the first flow direction 308, and the outlet flow path 320 is aligned to exhaust fluid from the core tie hole 300 aligned with the second flow direction 310 along the second flow channel 306.

In one non-limiting example, the first flow path and the second flow path can be defined by the first, second, or third cooling channels 130, 132, 134 of FIG. 4. The core tie holes 170 can provide for improving flow directionality, maintaining pressure along the entirety of the cooling circuit, or minimizing stagnation along portions of the channels.

The core tie holes 300 can provide for providing a flow of fluid between adjacent flow passages. During casting of the engine component 302, core ties can be used to increase structural integrity of a core and improve yields, while the remnant core tie holes 300 can be used to provide a flow within the engine component 302. The core ties can be positioned to form a core tie hole 300 at a particular location within the engine component 302. A flow through the core tie holes 300 at the particular locations can improve flow rates, minimize flow stagnation, or improve interior component cooling. Furthermore, the core tie holes 300 can be used to pass a flow of cooler fluid into a region that has warmer fluid relative to the cool fluid. Passing the cooler fluid provides a net temperature decrease for the temperature of the fluid in a passage downstream of the introduction of the cooler fluid. Further still, the core tie holes 300 can be used to change the pressure in the downstream passage.

Figure 9:
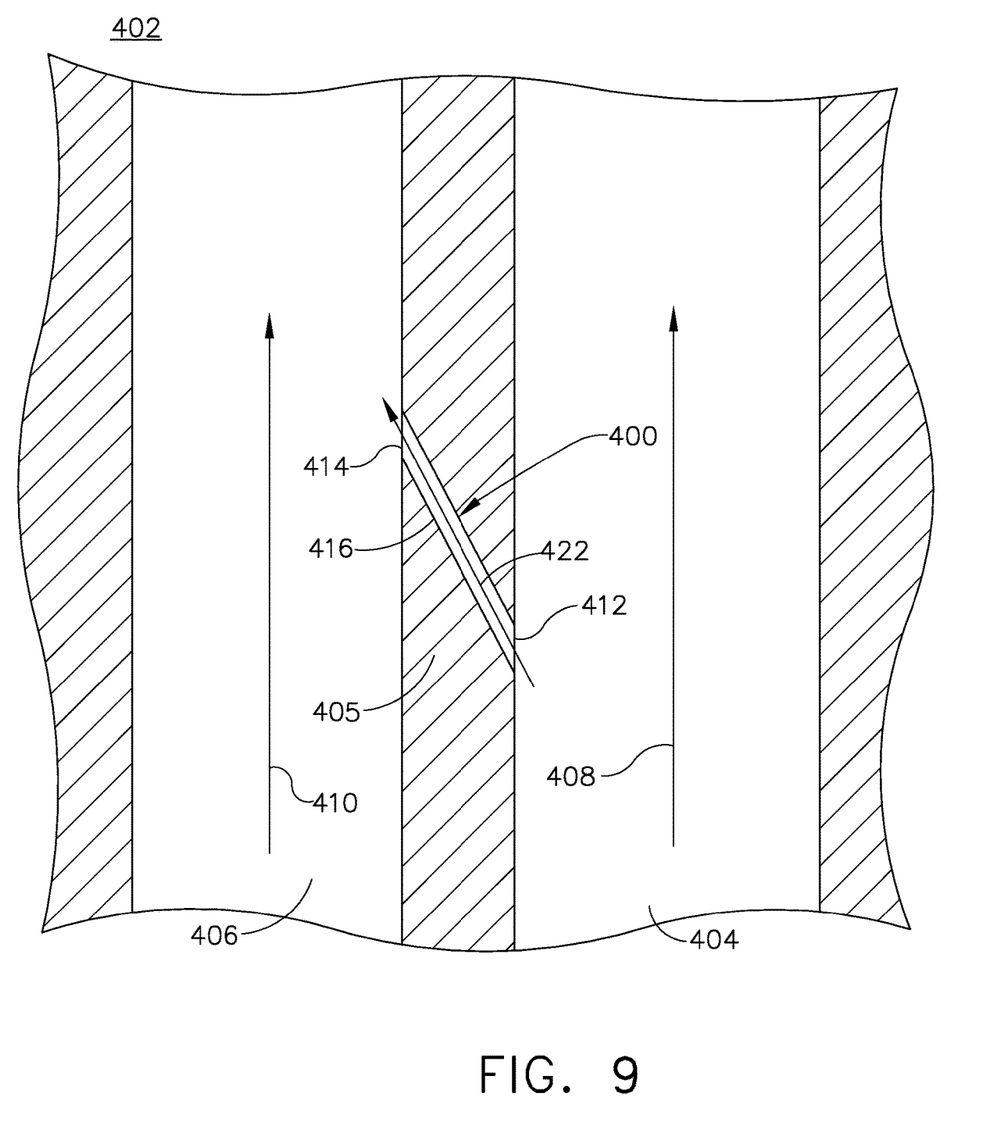
FIG. 9 is a section view of a straight core tie hole between adjacent cooling passages with flow paths in the same direction.

Referring to FIG. 9, another exemplary engine component 402 includes core tie hole 400. The engine component 402 of FIG. 9 can be substantially similar to that of FIG. 8. As such, similar elements will be described with similar numerals increased by a value of one-hundred and the discussion will be limited to differences between the two. The engine component 402 has a first flow channel 404 defining a first flow direction 408 that is parallel to, or in substantially the same direction as a second flow channel 406 defining a second flow direction 410. An internal wall 405 can separate the first and the second flow channels 404, 406. The core tie hole 400 can be provided in the internal wall 405 and can be linear, with an inlet 412 and an outlet 414 defining a passage 416 having a straight core tie flow path 422. The inlet 412 can be positioned upstream of the outlet 414 in order to carry the core tie flow path 422 in a direction aligned with the first and second flow directions 408, 410, In one non-limiting example, the first flow channel 404 and the second flow channel 406 can be the first cooling channel 130 and the leading edge cooling channel 126 of FIG. 4, respectively. The core tie hole 400 can be used to equalize pressures between adjacent flow paths or to minimize flow stagnation.

The core tie holes 400 can provide for providing a flow of fluid between adjacent flow passages. During casting of the engine component 402, core ties can be used to increase structural integrity of a core and improve yields, while the remnant core tie holes 400 can be used to provide a flow within the engine component 402. The core ties can be positioned to form a core tie hole 400 at a particular location within the engine component 402. A flow through the core tie holes 400 at the particular locations can improve flow rates, minimize flow stagnation, or improve interior component cooling. Furthermore, the core tie holes 400 can be used to pass a flow of cooler fluid into a region that has warmer fluid relative to the cool fluid. Passing the cooler fluid provides a net temperature decrease for the temperature of the fluid in a passage downstream of the introduction of the cooler fluid. Further still, the core tie holes 400 can be used to change the pressure in the downstream passage.

A method of casting a blade for a turbine engine can include forming a blade core having a first portion and a second portion coupled to one another by at least one core tie and casting the blade to have a first cooling passage formed by the first portion and a second cooling passage formed by the second portion, with at least one core tie hole formed by the at least one core tie fluidly coupling the first cooling passage and the second cooling passage.

The second cooling passage, for example, can be the trailing edge cooling passage 144 as described herein. The first cooling passage can be a passage adjacent the trailing edge cooling passage 144, such as the trailing edge plenum 138. Additionally, the method can include positioning at least one core tie at a tip turn of the first portion. The adjacent passage can form a tip turn, such as the tip turn 156 of the trailing edge plenum 138. This can be formed as a tip turn in the first portion of the core.

The method can further comprise removing the core from the cast blade. Such removal can include leaching the core, for example. Additionally, the method can further include stabilizing the core with the at least one core tie.

Further still, the method can include where passing the volume of air through the core tie hole minimize dust accumulation within the first channel. While described has dust accumulation, it should be understood that dust accumulation can be accumulation of any particulate matter entering the engine that can become entrapped within the core tie holes as described herein. Such particulate matter can include, in non-limiting examples, dirt, sand, or volcanic ash.

The core tie hole can be provided at a radially inward facing surface of a radially outer end of the first channel. For example, the core tie holes can be the core tie holes 270 of FIG. 7, provided on the radially inwardly facing surface 290 of the radially outer end 292 of the channel. Furthermore, the first channel can be a trailing edge cooling channel, such as the trailing edge cooling channel 244 of FIG. 7. Similarly, the second cooling channel can be a trailing edge plenum or a tip turn thereof, such as the trailing edge plenum 238 or the tip turn 256 of FIG. 7.

The aspects of the core ties and the core tie holes remnant of the core ties as described herein can provide for improved strength and structural integrity of a core during casting operations. Such improvements can increase product yield. Additionally, the core tie holes remnant of the core ties can be used to adapt cooling flows and pressures within the resultant engine component to improve flow rates or component cooling.

It should be appreciated that application of the disclosed design is not limited to turbine engines with fan and booster sections, but is applicable to turbojets and turbo engines as well.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of flowing a fluid through an airfoil for a turbine engine, with the airfoil including a leading edge and a trailing edge, defining a chord-wise direction therebetween, and including a root and a tip, defining a span-wise direction therebetween, and further including a trailing edge plenum extending in the span-wise direction and turning to the chord-wise direction at a tip turn, a trailing edge cooling channel extending in the span-wise direction adjacent the trailing edge, and a rib separating the trailing edge plenum from the trailing edge cooling channel, the method comprising:

passing a volume of air along the trailing edge plenum in the span-wise direction wherein a first portion of the volume of air passes through a plurality of openings provided in the rib, fluidly coupling the span-wise extent of the trailing edge plenum to the trailing edge cooling channel;

turning, with the tip turn, a second portion of the volume of air within the trailing edge plenum from the span-wise direction toward the chord-wise direction;

passing at least some of the second portion of the volume of air through a core tie hole provided in the rib, directly coupling the trailing edge plenum to the trailing edge cooling channel; and flowing the first portion of the volume of air from the plurality of openings and the second portion of the volume of air from the core tie hole through one or more trailing edge exhaust holes.

2. The method of claim 1 wherein the core tie hole is angled to determine a flow direction.

3. The method of claim 1 wherein the core tie hole provides for radially exhausting particulate matter from within the trailing edge plenum.

4. The method of claim 3 wherein the core tie hole is provided at a radially inward facing surface of a radially outer end of the trailing edge plenum.

* * * * *